(12) United States Patent
Chang et al.

(10) Patent No.: US 8,139,673 B2
(45) Date of Patent: Mar. 20, 2012

(54) TRANSMISSION METHOD OF WIRELESS SIGNAL AND TRANSMITTER USING THE SAME

(75) Inventors: Hsien-Wen Chang, Hsinchu (TW); Chorng-Ren Sheu, Kaohsiung (TW); Ming-Chien Tseng, Kaohsiung County (TW); Ching-Yung Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 947 days.

(21) Appl. No.: 12/139,658

(22) Filed: Jun. 16, 2008

(65) Prior Publication Data

US 2009/0257515 A1  Oct. 15, 2009

(30) Foreign Application Priority Data

Apr. 9, 2008  (TW) ............................... 97112760 A

(51) Int. Cl.
*H04L 27/00* (2006.01)
*H04L 27/12* (2006.01)

(52) U.S. Cl. ........................................ 375/295; 375/299

(58) Field of Classification Search .................. 375/260, 375/267, 295, 299; 370/281, 343, 480, 203–204, 370/208, 295
See application file for complete search history.

(56) References Cited

U.S. PATENT DOCUMENTS

| | | | | |
|---|---|---|---|---|
| 6,654,408 B1 * | 11/2003 | Kadous et al. | ................ | 375/148 |
| 7,636,573 B2 | 12/2009 | Walton et al. | | |
| 2003/0125040 A1 | 7/2003 | Walton et al. | | |
| 2004/0131007 A1 | 7/2004 | Smee et al. | | |
| 2004/0196780 A1 * | 10/2004 | Chin et al. | ................ | 370/208 |
| 2009/0028264 A1 * | 1/2009 | Zhang et al. | ................ | 375/267 |
| 2009/0080372 A1 * | 3/2009 | Naka et al. | ................ | 370/328 |
| 2010/0322080 A1 * | 12/2010 | Sung et al. | ................ | 370/242 |

FOREIGN PATENT DOCUMENTS

| | | |
|---|---|---|
| EP | 1 876 730 | 1/2008 |
| TW | I269543 | 12/2006 |
| TW | I269546 | 12/2006 |
| TW | I269549 | 12/2006 |
| WO | WO 03/019812 | 3/2003 |
| WO | WO2007080678 | 7/2007 |

OTHER PUBLICATIONS

Je et al., A Novel Multiple Access Scheme for Uplink Cellular Systems, 2004, Vehicular Technology Conference, 2004. VTC2004-Fall. 2004 IEEE 60th, vol. 2, pp. 984-988.*

Chang et al., Correlated Scrambling Diversity Scheme for 802.16m E-MBS in MBSFN, Jan. 5, 2009, IEEE 802.16 Broadband Wireless Access Working Group, pp. 18.*

(Continued)

*Primary Examiner* — Lawrence B Williams

(74) *Attorney, Agent, or Firm* — Thomas|Kayden

(57) ABSTRACT

A transmission method of a wireless signal including the following steps is provided. Multiple orthogonal frequency division multiplexing (OFDM) symbols carried by multiple subcarriers are generated according to a data signal. A scrambling pattern including multiple scrambling symbols is generated, wherein the scrambling symbols respectively correspond to the subcarriers in the frequency domain. The scrambling symbols corresponding to two contiguous subcarriers are correlated. The scrambling symbols are utilized to encode the OFDM symbols carried by the corresponding subcarriers.

22 Claims, 10 Drawing Sheets

OTHER PUBLICATIONS

Chang et al., Correlated Scrambling Scheme for Time-Frequency Diversity in OFDM Single-Frequency-Network Systems, Sep. 21-12, 2008, Vehicular Technology Conference, 2008. VTC 2008-Fall. IEEE 68th, pp. 15.*

Taiwanese language office action dated Dec. 13, 2011.

English language translation of abstract of TW I269543 (published Dec. 21, 2006).

English language translation of abstract of TW I269546 (published Dec. 21, 2006).

English language translation of abstract of TW I269549 (published Dec. 21, 2006).

* cited by examiner

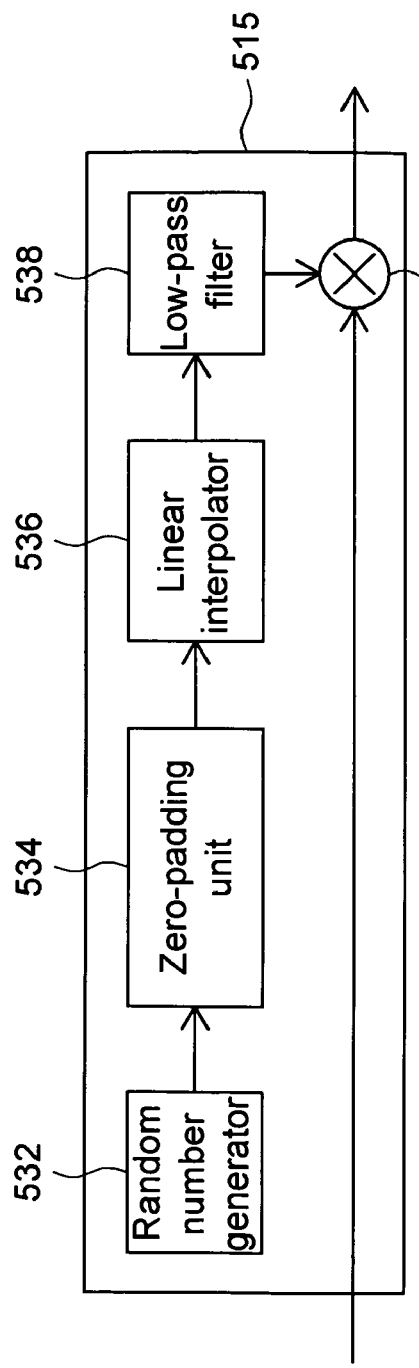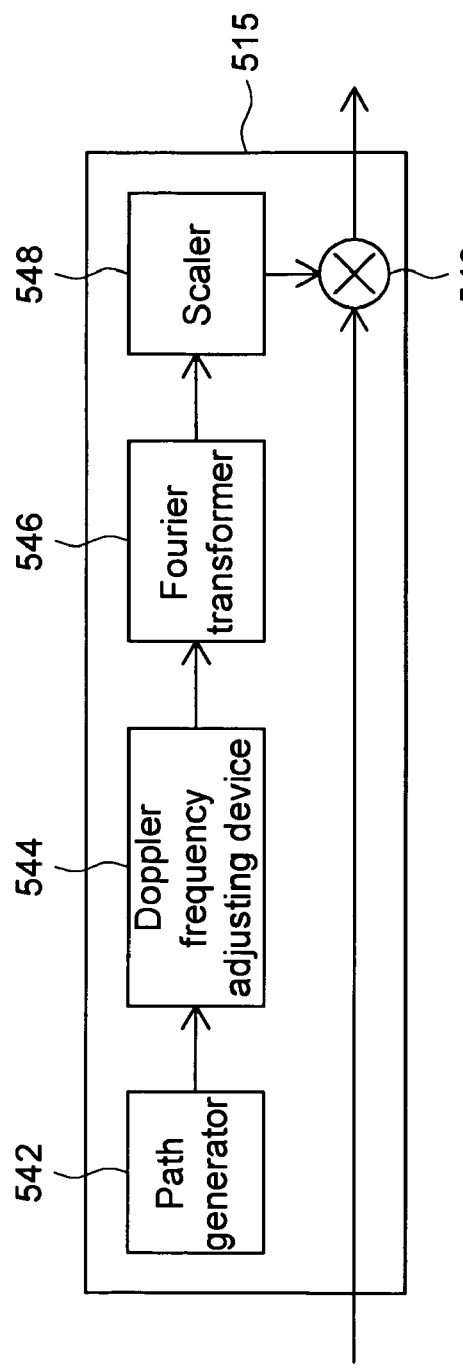

TRANSMISSION METHOD OF WIRELESS SIGNAL AND TRANSMITTER USING THE SAME

This application claims the benefit of Taiwan application Serial No. 97112760, filed Apr. 9, 2008, the subject matter of which is incorporated herein by reference.

BACKGROUND OF THE INVENTION

1. Field of the Invention

The invention relates in general to a transmission method of a wireless signal and a transmitter using the same, and more particularly to a transmission method of a wireless signal which possesses time frequency diversity and facilitates channel estimation and a transmitter using the same.

2. Description of the Related Art

In a wireless communication system, a transmitter is utilized to transmit a wireless signal to a receiver in the form of an electromagnetic wave through physical channels such as air. Due to practical channel effects such as multipath reflection or propagation fading, the wireless signal received by the receiver may be distorted. If the multipath signal received by the receiver has a large delay spread, the coherent bandwidth of the multipath signal will be smaller than the coherent bandwidth of a single path signal, and the channel response of the multipath signal will result in frequency selective fading. Orthogonal frequency division multiplexing (OFDM) modulation technology based on multicarrier modulation is capable of resolving the problem of channel response of frequency selective fading and has thus become a mainstream technology in the application and development of wireless communication.

The OFDM modulation technology is used in wireless communication systems and digital audio and video broadcasting systems to perform high spectral efficiency transmission. The network framework of an OFDM system may be a multiple frequency network (MFN) or a single-frequency network (SFN). SFN is a broadcasting network, and all transmitters transmit the same signal through the same frequency channel at the same time. SFN has several advantages such as wide network coverage, excellent efficiency of frequency utilization, and the mobile user can receive the signal without switching to another frequency band in the network coverage as moving. Examples of OFDM-based SFN systems include digital video broadcasting-terrestrial (DVB-T), digital video broadcasting-handheld (DVB-H), digital audio broadcasting (DAB), digital multimedia broadcast-terrestrial (DMB-T) and media forward link only (Media-FLO).

OFDM in conduction with channel coding and time interleaving may enhance system performance. Even if error occurs because of part of the received signal with poor channel response, the erroneous bytes of the received signal still have chance to be corrected through channel decoding technology with reference to the other part of the received signal with better channel response. The functions of channel coding and time interleaving can further combine the diversity technology, such that the channel response of the received signal possesses diversity. Diversity transmitting/receiving is normally used in the OFDM system to provide larger channel diversity and enhance system performance with excellent diversity gain.

SFN used in the OFDM system has wide network coverage and many transmitters. At the cell edge between transmitters in the SFN, it may happen that a receiver receives the same signal from two transmitters almost simultaneously. The tiny delay spread results in flat fading channel response with a wide coherent bandwidth. If signals from the two transmitters have phase reversed to one another, their destructive combination hence results in a totally faded flat channel. It is even worse that, for a static/quasi-static receiver, this terrible situation may continue for a long time relative to the time interleaving length. Under such circumstances (flat and/or slow fading), a poor performance due to burst errors is expected for OFDM systems.

Referring to FIG. 1A and FIG. 1B. FIG. 1A shows a partial perspective of a conventional wireless communication system. FIG. 1B shows an example of flat fading channel response of the conventional wireless communication system. In the wireless communication system 100, the receiver 110 is located in the coverage boundary between the transmitter 102 of region A and the transmitter 108 of region B. The transmitter 102 and the transmitter 108 respectively transmit identical wireless signals 112 and 118 containing multiple pilot symbols p and multiple data symbols d (0), d (1), ..., d (k). The channel response of the wireless signal 112 passing through region A is $h_a$, and the channel response of the wireless signal 118 passing through region B is $h_b$. If both the wireless signal 112 transmitted by the transmitter 102 and the wireless signal 118 transmitted by the transmitter 108 are $s_{00}$, then the wireless signal 120 received by the receiver 110 is $s_{01}$, which is expressed as:

$$s_{01} = s_{00} \times (h_a + h_b)$$

As the wireless signals 112 and 118 correspond to a smaller multipath delay spread and have reversed phase rotation, destructive interference may occur. When the channel response $h_a$ is approximately equal to $-h_b$, the receiver 110 will generate a flat fading channel response ($h_a + h_b \sim 0$) with low amplitude. Consequently, the coherent bandwidth is huge and channel response is lacking of diversity. Furthermore, the value of the low channel response 122 of the received signal caused by destructive interference may be smaller than the threshold value 124 of the signal detector of the receiver 110, hence resulting that the received signal cannot be correctly detected, and the receiving function of the wireless communication system is largely degraded. Therefore, it is important to 'create' diversity for solving the problem without affecting the receiver design (i.e., backwards compatible).

Diversity technology avoids the occurrence of low and flat channel response. Referring to FIG. 2, an example of channel response of the conventional wireless communication system adopting group scrambling diversity technology is shown. In FIG. 2, a group scrambling method is adopted to divide multiple subcarriers into groups. For example, the signal transmitted by the first transmitter is divided into subcarrier groups 211~212, and the signal transmitted by the second transmitter is divided into subcarrier group 221~222, wherein each subcarrier group includes multiple data symbols and multiple pilot symbols.

Each subcarrier group respectively encodes multiple data symbols and multiple pilot symbols with different scrambling symbols. Thus, in the coverage boundary between two transmitters, the receiver experiences a channel response 240 with diversity when receiving a wireless signal 230. For the channel response 240, each subcarrier group is independent to one another, and thus frequency diversity gain is obtained. However, the combined channel response 240 has discontinuity, so the group scrambling method is unfavorable to the channel estimation in the frequency domain, hence decreasing the accuracy and increasing the complexity of the channel estimation of the receiver. Besides, the group scrambling method cannot obtain time diversity gain against slow fading.

Referring to FIG. 3, another example of channel response of the conventional wireless communication system adopting grid scrambling diversity technology is shown. In FIG. 3, a grid group scrambling method is adopted to divide multiple subcarriers into grids in time and frequency dimension. For example, the signal transmitted by the first transmitter during the time period C is divided into grid 311~312, the signal transmitted by the first transmitter during the time period D is divided into grid 313~314, the signal transmitted by the second transmitter during the time period C is divided into grid 321~322, and the signal transmitted by the second transmitter during the time period DI is divided into grid 323~324, wherein each grid includes multiple data symbols and multiple pilot symbols.

Each grid respectively encodes multiple data symbols and multiple pilot symbols with different scrambling symbols. Thus, in the coverage boundary between two transmitters, the receiver experiences a channel response 340 with diversity when receiving a wireless signal 330. For the channel response 340, each grid is independent to one another, and thus frequency diversity gain is obtained and destructive signal interference is avoided. Moreover, the grid group scrambling method obtains time diversity gain against slow fading nature. However, the combined channel response 340 has discontinuity, so the grid group scrambling method is unfavorable to the channel estimation, hence decreasing the accuracy and increasing the complexity of the channel estimation of the receiver.

SUMMARY OF THE INVENTION

The invention is directed to a transmission method of a wireless signal and a transmitter using the same. A correlated scrambler of a transmitter is utilized, such that a receiver has a time frequency diversity gain even at the cell coverage boundary. Moreover, the channel response of the signal received by the receiver has continuity, hence increasing the accuracy of the channel estimation of the receiver.

According to a first aspect of the present invention, a transmission method of a wireless signal including the following steps is provided. Multiple orthogonal frequency division multiplexing (OFDM) symbols carried by multiple subcarriers are generated according to a data signal. A scrambling pattern, including multiple scrambling symbols respectively corresponding to the subcarriers in the frequency domain, is generated, wherein the scrambling symbols corresponding to two contiguous subcarriers are correlated. The scrambling symbols are utilized to encode the OFDM symbols carried by corresponding subcarriers.

According to a second aspect of the present invention, a transmitter of a wireless signal including an OFDM multiplexer and a correlated scrambler is provided. The OFDM multiplexer is for generating multiple OFDM symbols according to a data signal, wherein the OFDM symbols are carried by multiple subcarriers. The correlated scrambler is for generating a scrambling pattern. Multiple scrambling symbols of the scrambling pattern are utilized to encode the OFDM symbols carried by corresponding subcarriers. The scrambling symbols corresponding to two contiguous subcarriers are correlated.

The invention will become apparent from the following detailed description of the preferred but non-limiting embodiments. The following description is made with reference to the accompanying drawings.

BRIEF DESCRIPTION OF THE DRAWINGS

FIG. 6 shows a block diagram of an example of a correlated scrambler according to the preferred embodiment of the invention;

FIG. 7 shows a block diagram of another example of a correlated scrambler according to a preferred embodiment of the invention;

DETAILED DESCRIPTION OF THE INVENTION

The invention provides a transmission method of a wireless signal and a transmitter using the same. A correlated scrambler of a transmitter is utilized to encode the orthogonal frequency division multiplexing (OFDM) symbols carried by corresponding subcarriers according to multiple scrambling symbols which are highly correlated but not identical, such that the receiver has a time frequency diversity gain at the coverage boundary between two or more than two transmitters. Moreover, the channel response of the signals received by the receiver has continuity, hence increasing the accuracy of the channel estimation of the receiver.

Figure 1A:
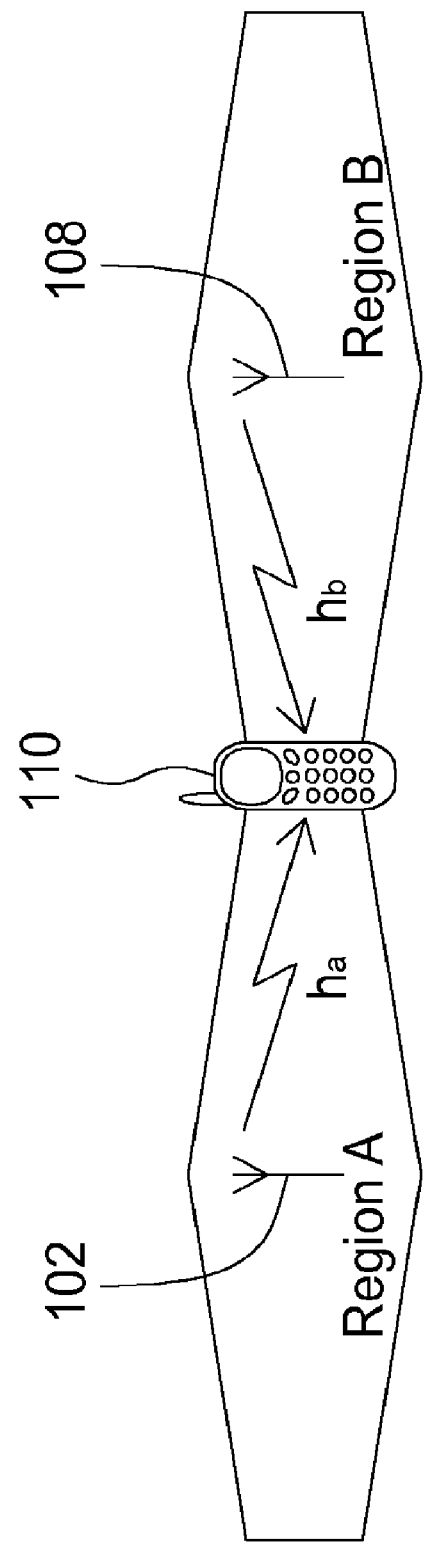
FIG. 1A (Prior Art) shows a partial perspective of a conventional wireless communication system.
Figure 1B:
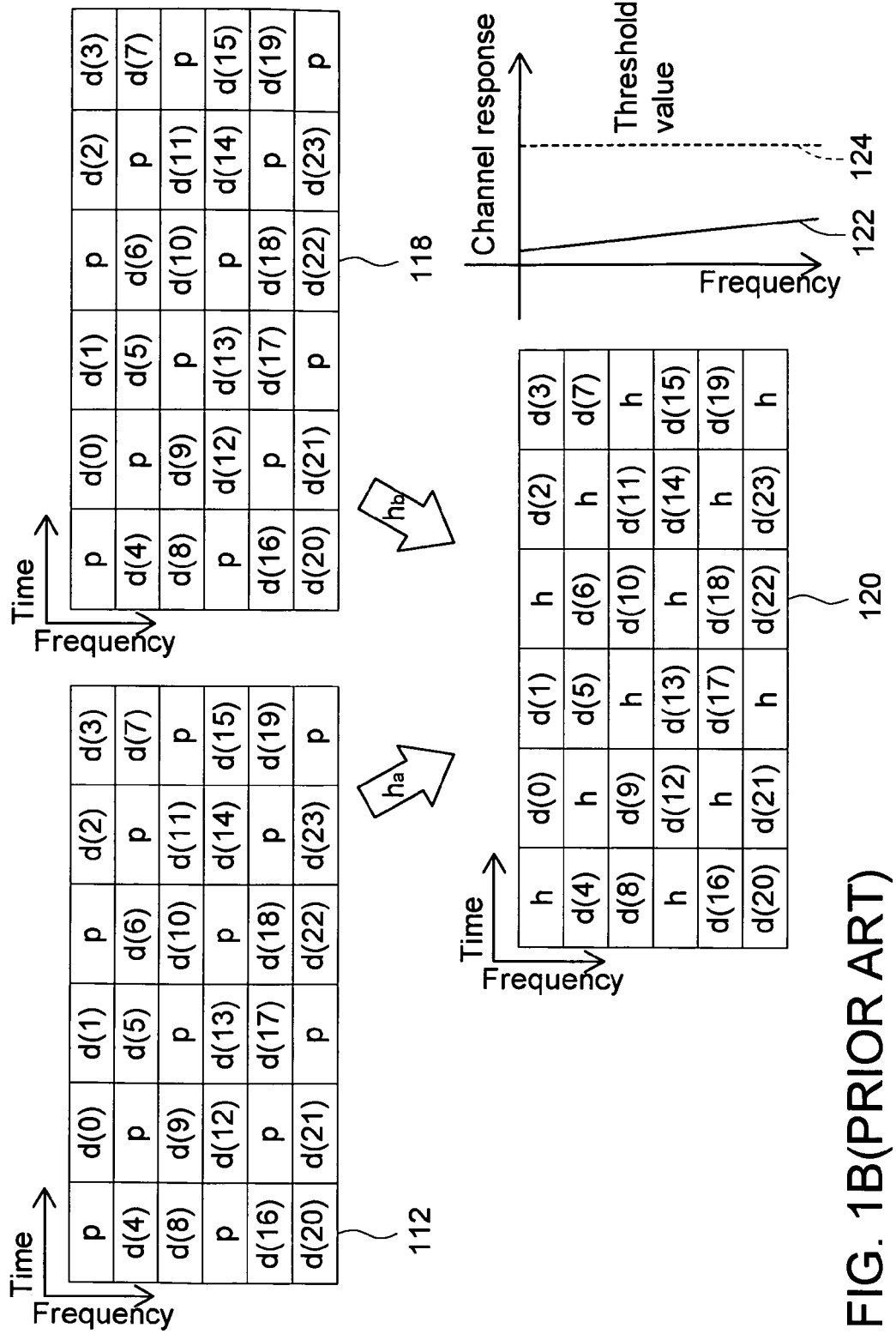
FIG. 1B (Prior Art) shows an example of flat fading channel response of the conventional wireless communication system.
Figure 2:
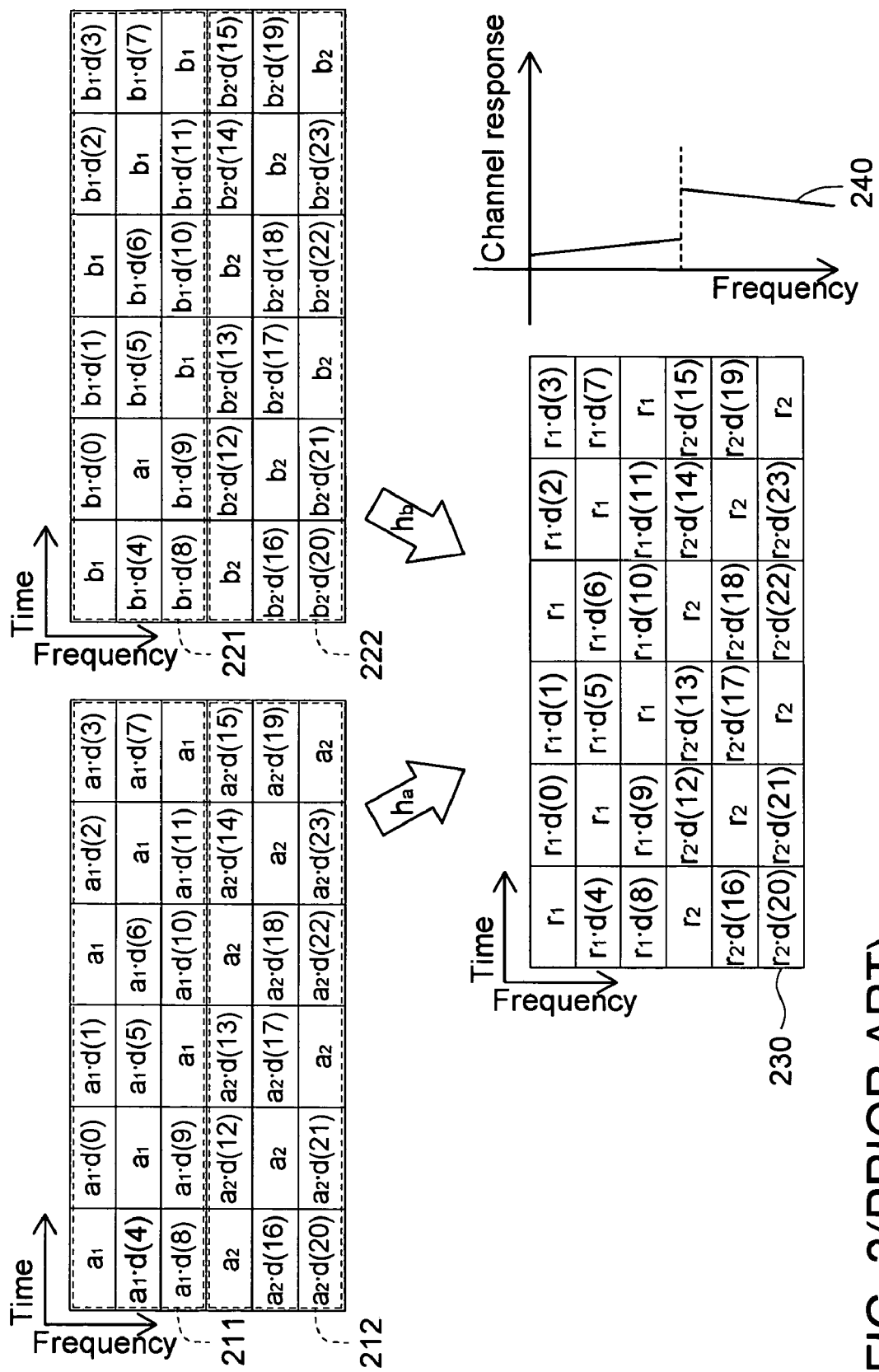
FIG. 2 (Prior Art) shows an example of channel response of the conventional wireless communication system adopting group scrambling diversity technology.
Figure 3:
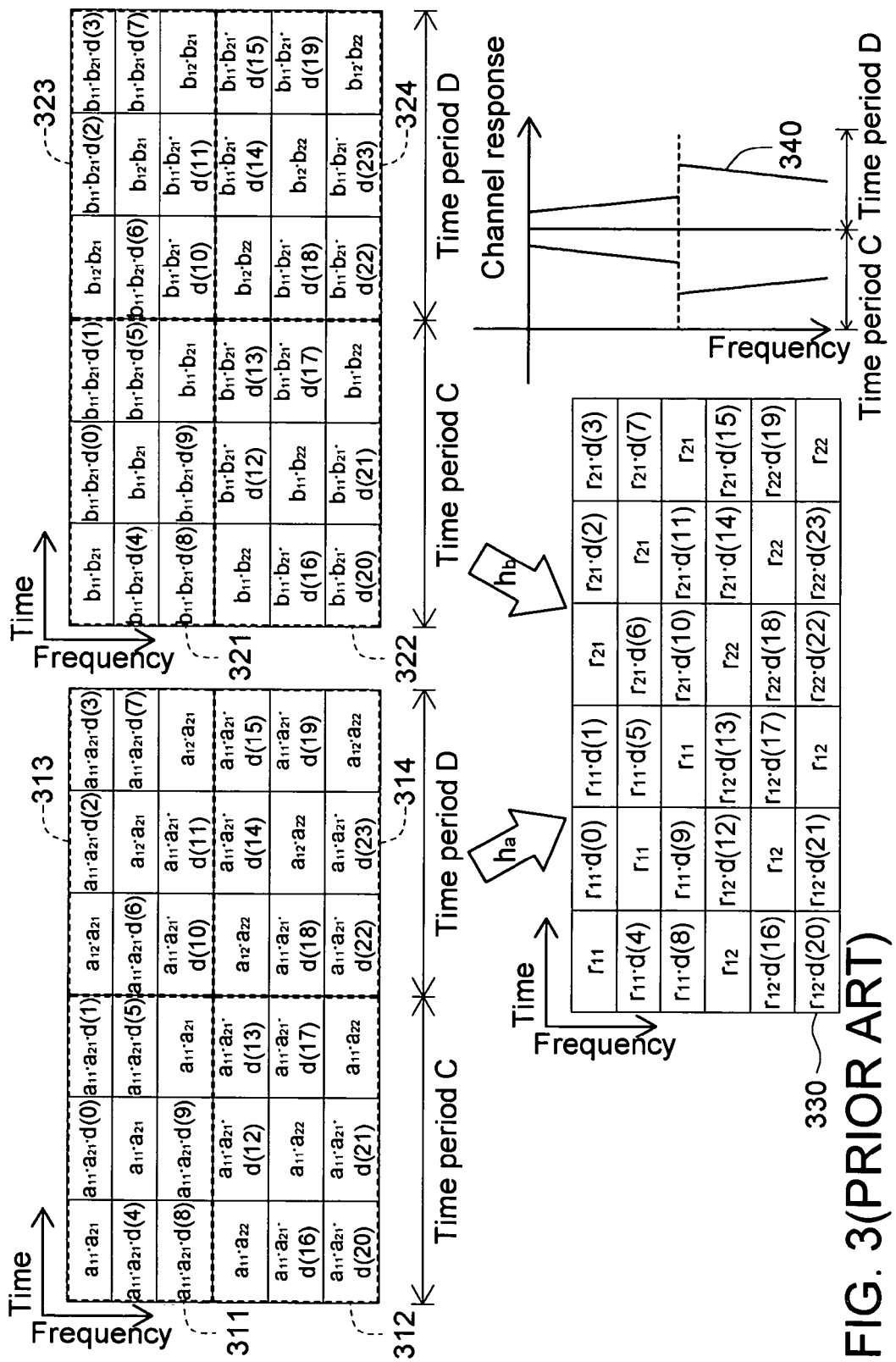
FIG. 3 (Prior Art) shows another example of channel response of the conventional wireless communication system adopting grid scrambling diversity technology.
Figure 4A:
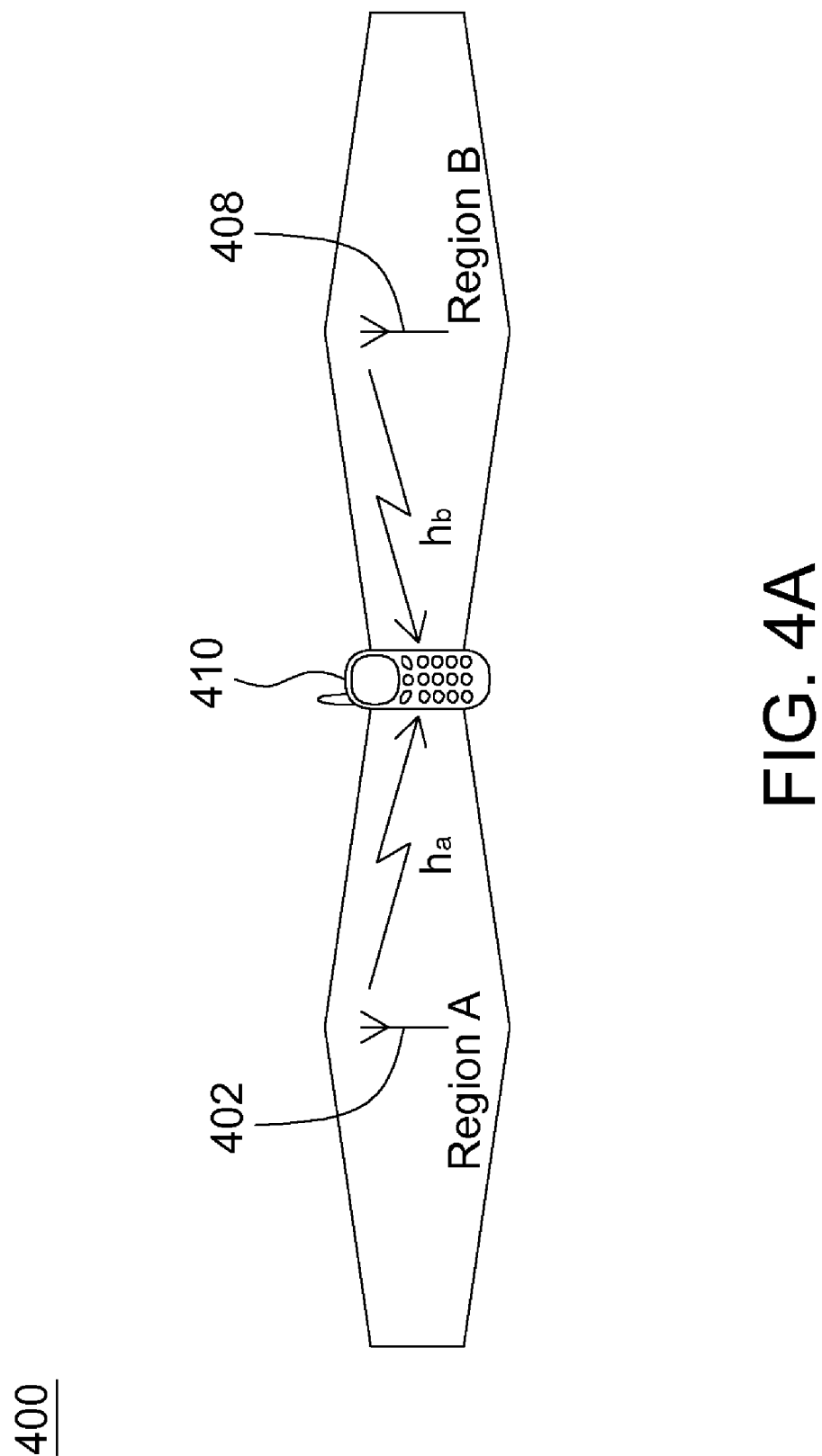
FIG. 4A shows a partial perspective of a wireless communication system according to a preferred embodiment of the invention.
Figure 4B:
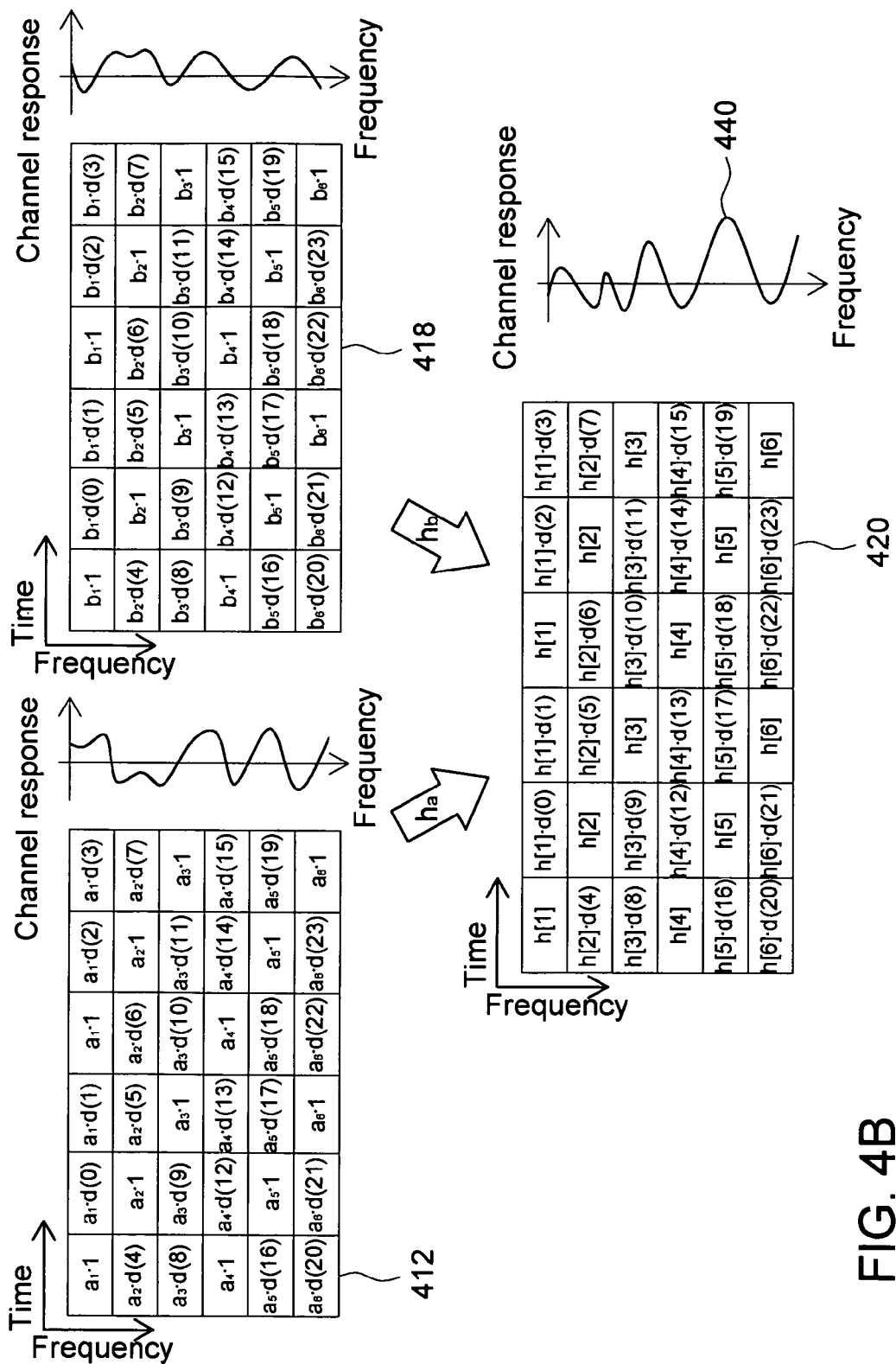
FIG. 4B shows an example of channel response of the wireless communication system according to the preferred embodiment of the invention.

Referring to FIG. 4A and FIG. 4B. FIG. 4A shows a partial perspective of a wireless communication system according to a preferred embodiment of the invention. FIG. 4B shows an example of channel response of the wireless communication system according to the preferred embodiment of the invention. In FIG. 4A, the network framework of the wireless communication system 400 is a SFN. In the wireless communication system 400, the receiver 410 is located in the coverage boundary between the transmitter 402 of region A and the transmitter 408 of region B. The transmitter 402 and the transmitter 408 respectively transmit a wireless signal 412 and a wireless signal 418 which are identical and contain multiple OFDM symbols, wherein the OFDM symbols are carried by multiple subcarriers. The channel response of the wireless signal 412 passing through region A is $h_a$, and the channel response of the wireless signal 418 passing through region B is $h_b$. If the wireless signal 412 transmitted by the transmitter 402 is $s_{11}$ and the wireless signal 418 transmitted by the transmitter 408 is $s_{12}(=s_{11})$, then the wireless signal 420 received by the receiver 410 is $s_{13}$, which is expressed as:

$$s_{13}=s_{11}\times h_a+s_{12}\times h_b$$

In FIG. 4B, multiple OFDM symbols of the wireless signal 412 and the wireless signal 418 include pilot symbols "1" and data symbols d (0), d (1), . . . , d (k). Before transmission, the transmitter 402 generates a scrambling pattern which includes multiple scrambling symbols, wherein the scrambling symbols all have an equivalent unit gain and respectively correspond to multiple subcarriers in the frequency domain. The multiple scrambling symbols of the scrambling pattern generated by the transmitter 402 substantially are not identical, and the scrambling symbols corresponding to two contiguous subcarriers are highly correlated. Besides, the frequency difference between two contiguous pilot symbols in the frequency domain is smaller than the coherent bandwidth of the scrambling pattern. That is, the scrambling pattern is substantially generated according to the design of the pilot symbols of the wireless signal.

Similarly, the transmitter 408 generates another scrambling pattern which also includes multiple scrambling symbols. The scrambling symbols substantially are not identical, but the scrambling symbols corresponding to two contiguous subcarriers are highly correlated. The scrambling pattern generated by the transmitter 402 and that generated by the transmitter 408 are independent. The signals encoded according to the scrambling symbols of the two scrambling patterns can be transferred to inverse fast Fourier transformers (IFFT) (not illustrated in FIG. 4A and FIG. 4B) of the transmitter 402 and the transmitter 408.

The scrambling pattern generated by the transmitter 402 of region A is $[a_1, a_2, \ldots, a_M]$ as exemplified, and the scrambling pattern generated by the transmitter 408 of region B is $[b_1, b_2, \ldots, b_M]$ as exemplified, wherein M is the number of subcarriers in each of the transmitter 402 and the transmitter 408. The M scrambling symbols $a_1 \sim a_M$ substantially are not identical, but contiguous scrambling symbols are highly correlated. Likewise, the M scrambling symbols $b_1 \sim b_M$ substantially are not identical, but the contiguous scrambling symbols are highly correlated. The channel response of the wireless signal received from the transmitter 402 and the transmitter 408 through a SFN is expressed as:

$$h[1] = h_a \times a_1 + h_b \times b_1,$$
$$h[2] = h_a \times a_2 + h_b \times b_2,$$
$$h[3] = h_a \times a_3 + h_b \times b_3,$$
$$\vdots$$
$$h[M] = h_a \times a_M + h_b \times b_M.$$

For example, if each of the transmitter 402 and the transmitter 408 has 6 subcarriers, that is, M=6, then the scrambling pattern of the transmitter 402 of region A is $[a_1, a_2, \ldots, a_6]$, and the scrambling pattern of the transmitter 408 of region B is $[b_1, b_2, \ldots, b_6]$. The scrambling symbols $a_1 \sim a_6$ are not identical but contiguous scrambling symbols are highly correlated. The scrambling symbols $b_1 \sim b_6$ are not identical, but contiguous scrambling symbols are highly correlated. The channel response of the wireless signal received from the transmitter 402 and the transmitter 408 through a SFN is expressed as:

$$h[1] = h_a \times a_1 + h_b \times b_1,$$
$$h[2] = h_a \times a_2 + h_b \times b_2,$$
$$h[3] = h_a \times a_3 + h_b \times b_3,$$
$$h[4] = h_a \times a_4 + h_b \times b_4,$$
$$h[5] = h_a \times a_5 + h_b \times b_5,$$
$$h[6] = h_a \times a_6 + h_b \times b_6.$$

Thus, the channel response 440 of the wireless signal 420 possesses both the features of diversity and continuity, not only obtaining a frequency diversity gain, but also facilitating the receiver 410 to estimate the channel. As a result, the complexity of the channel estimation is reduced and the accuracy of the channel estimation of channel is increased. Furthermore, the transmission method of a wireless signal disclosed in the present embodiment of the invention also enables the transmitter 402 and the transmitter 408 to generate different scrambling patterns during different time periods. The different scrambling patterns make the frequency difference between two contiguous pilot symbols in the frequency domain smaller than the coherent bandwidth of the scrambling pattern in frequency dimension and make the time difference between two contiguous pilot symbols in the time domain smaller than the coherent time of the scrambling pattern in time dimension. Thus, the wireless signal 420 obtains a time frequency diversity gain and meanwhile the channel may be estimated in the time domain.

Figure 5:
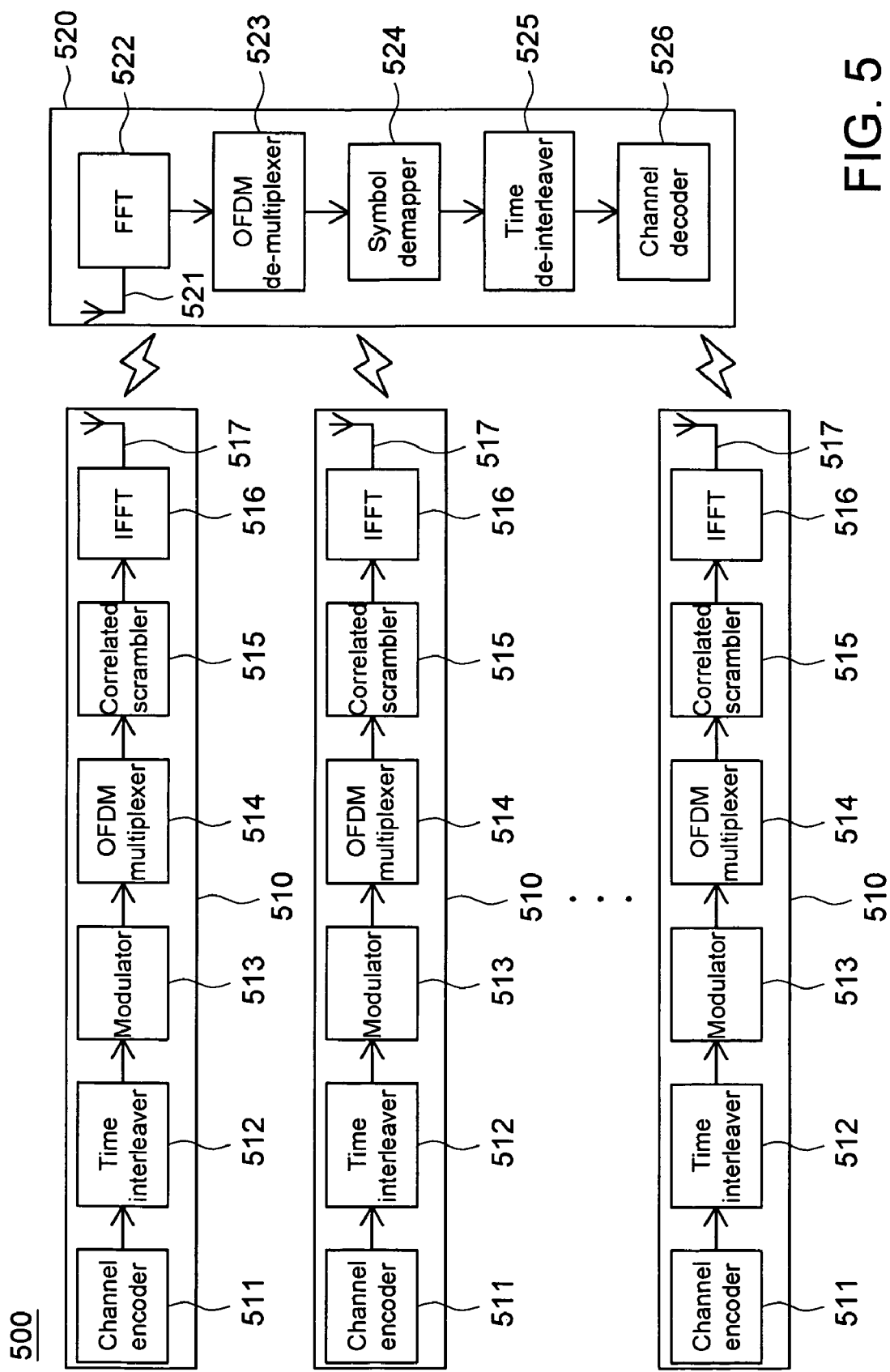
FIG. 5 shows a block diagram of the wireless communication system according to the preferred embodiment of the invention.

Referring to FIG. 5, a block diagram of the wireless communication system according to the preferred embodiment of the invention is shown. The wireless communication system 500 includes multiple transmitters 510 and single receiver 520. In the wireless communication system 500, under the configuration of SFN, identical data signals are transmitted through multiple transmitters 510. The transmitter 510 includes a channel encoder 511, a time interleaver 512, a modulator 513, an OFDM multiplexer 514, a correlated scrambler 515, an IFFT 516 and an antenna 517.

The to-be-transmitted data signals are channel-encoded by the channel encoder 511. Then, the channel-encoded data signals are time-interleaved by the time interleaver 512 and then are modulated by the modulator 513. Next, multiple OFDM symbols are generated by the OFDM multiplexer 514, wherein the OFDM symbols are carried by multiple subcarriers. Afterwards, the OFDM symbols are transmitted to the correlated scrambler 515. The correlated scrambler 515 generates a scrambling pattern including multiple scrambling symbols. The OFDM symbols are encoded according to the scrambling pattern first and transferred to the IFFT 516 next. On the part of the transmitter 510, the channel encoder 511 and the time interleaver 512 prevent continuity errors, such that the receiver can correct wrong bytes according to the data bytes that are correctly received.

Referring to FIG. 6, a block diagram of an example of a correlated scrambler according to the preferred embodiment of the invention is shown. The correlated scrambler 515 includes a random number generator 532, a zero-padding unit 534, a linear interpolator 536, a low-pass filter 538 and a multiplier 539. The random number generator 532 is for generating a group of random numbers ranging from $0\sim2\pi$. The zero-padding unit 534 is for enabling the random numbers to be uniformly distributed corresponding to multiple subcarriers of the transmitter 510. The linear interpolator 536 is for linearly interpolating the uniformly distributed random numbers. The low-pass filter 538 is for low-pass filtering the linearly interpolated random numbers, that is, the phase of each scrambling symbol of the scrambling pattern. The multiplier 539 utilizes the scrambling pattern to encode the OFDM symbols carried by the corresponding subcarriers. After that, the IFFT 516 transforms the encoded multiple OFDM symbols in the frequency domain into a wireless signal in the time domain, which is transmitted by the antenna 517 next.

The scrambling pattern generated by the correlated scrambler 515 includes multiple scrambling symbols, wherein the multiple scrambling symbols all have a unit gain and respectively correspond to multiple subcarriers in the frequency domain. The scrambling symbols substantially are not identical, but the scrambling symbols corresponding to two contiguous subcarriers are highly correlated. Besides, the frequency difference between two contiguous pilot symbols in the frequency domain is smaller than the coherent bandwidth of the scrambling pattern. That is, the scrambling pattern is substantially generated according to the design of the pilot frequency symbols of the wireless signal. Thus, the channel response of the wireless signal received by the receiver 520 possesses both features of diversity and continuity, not only obtaining the frequency diversity gain but also facilitating the channel estimation of the receiver.

The receiver 520 includes an antenna 521 for receiving a wireless signal in the time domain, a fast Fourier transformer (FFT) 522, an OFDM de-multiplexer 523, a symbol demapper 524, a time de-interleaver 525 and a channel decoder 526. The FFT 522 transforms the wireless signal in the time domain into the wireless signal in the frequency domain. The signal in the frequency domain is then processed by the OFDM de-multiplexer 523, the symbol demapper 524, the time de-interleaver 525 and the channel decoder 526 for restoring the transmitted data signal.

The correlated scrambler 515 can also be implemented in another way. Referring to FIG. 7, a block diagram of another example of a correlated scrambler according to a preferred embodiment of the invention is shown. The correlated scrambler 515 includes a path generator 542, a Doppler frequency adjusting device 544, a Fourier transformer 546, a scaler 548 and a multiplier 549. The path generator 542 is for generating a group of time domain signals with a delay spread. The Doppler frequency adjusting device 544 is coupled between the path generator 542 and Fourier transform device 546 for fine-tuning the time domain signals generated by the path generator 542 according to a Doppler frequency. The Fourier transformer 546 takes Fourier-transform on the time domain signals to obtain a group of frequency domain signals. The scaler 548 scales the frequency domain signals such that the frequency domain signals, that are, the phases of scrambling symbols of the scrambling pattern, range from 0~2π. The multiplier 549 utilizes the scrambling pattern to encode the OFDM symbols carried by the corresponding subcarriers.

In the correlated scrambler 515 of FIG. 7, as the time domain signals are fine-tuned by the Doppler frequency adjusting device 544, the scrambling pattern generated by the correlated scrambler 515 will possess diversity in the time domain, making the channel response of the wireless signal received by the receiver 520 have a time diversity gain. Also, the time difference between two contiguous pilot symbols in the time dimension is smaller than the coherent time of scrambling pattern, and the receiver can estimate the channel in the time dimension. Furthermore, as the Fourier transformer 546 takes Fourier-transform on the time domain signals to obtain a group of frequency domain signals, the scrambling pattern generated by the correlated scrambler 515 is a group of not identical scrambling symbols with continuity. Thus, the channel response of the wireless signal received by the receiver 520 has a frequency diversity gain and facilitates the receiver 520 to estimate the channel.

Figure 8:
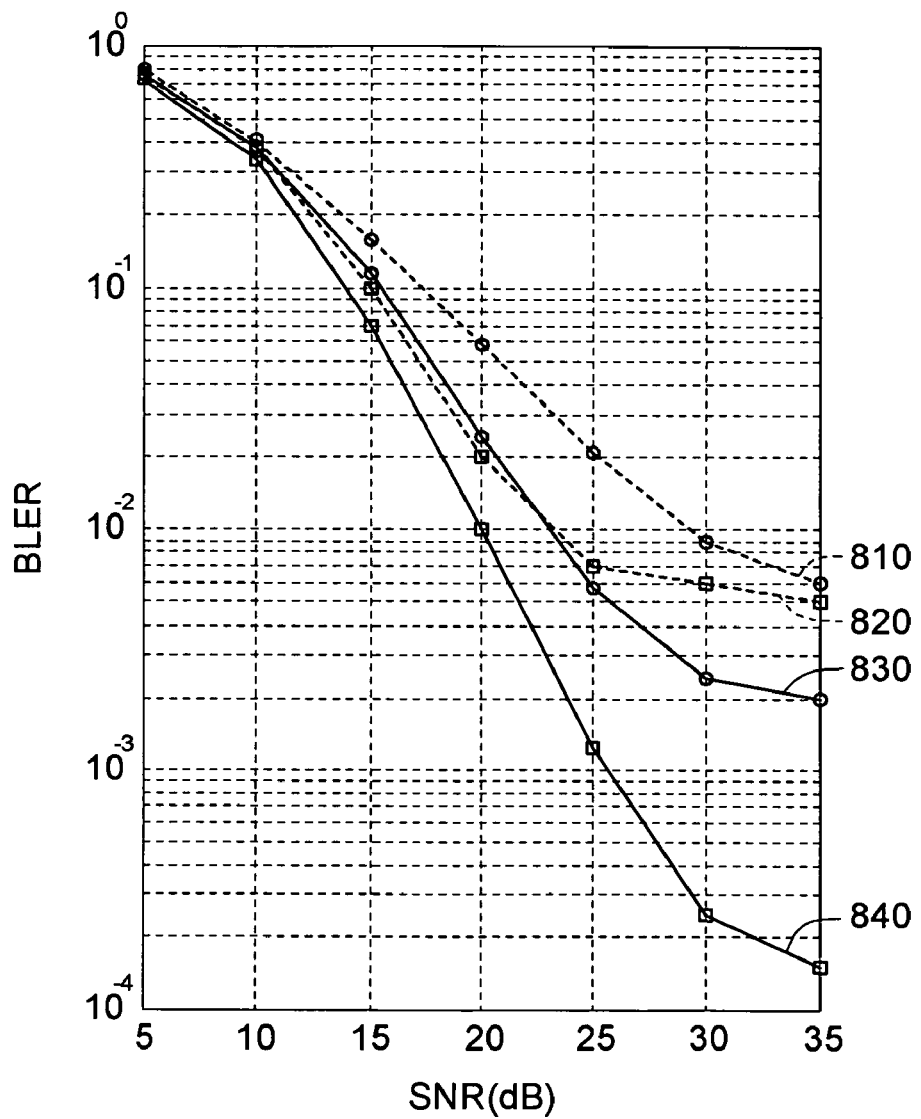
FIG. 8 shows an example of the simulation results of a wireless communication system with single-path channel model using various diversity technologies.

Referring to FIG. 8, an example of the simulation results of a wireless communication system with single-path channel model using various diversity technologies is shown. FIG. 8 is exemplified by two single-path channel models with a tiny delay spread. FIG. 8 shows a block error rate (BLER) 810 of a de-modulated wireless signal according to the conventional OFDM technology, a BLER 820 of a de-modulated wireless signal according to the group scrambling technology, a BLER 830 of a de-modulated wireless signal according to the grid group scrambling technology, and a BLER 840 of a de-modulated wireless signal according to the correlation scrambling technology. As indicated in FIG. 8, when the target BLER is $10^{-2}$, the BLER 840 according to the correlated scrambling technology at least outdoes the BLER 810 according to conventional OFDM technology, the BLER 820 according to the group scrambling technology and the BLER 830 according to the grid group scrambling technology by approximately 3.5 dB. That is, the receiver achieves better system performance under the same complexity of implementation.

Figure 9:
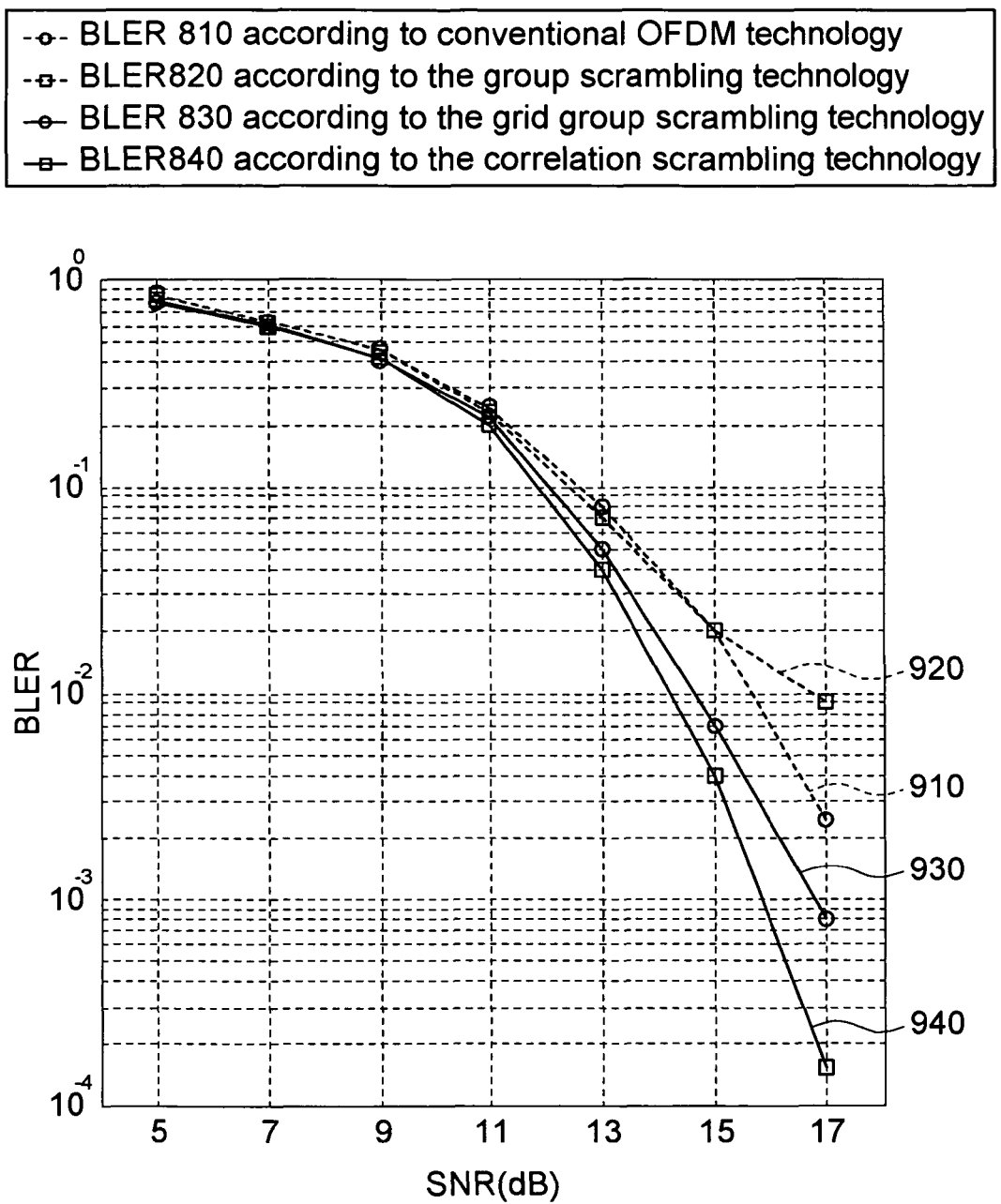
FIG. 9 shows another example of the simulation results of the wireless communication system with TU6 channel model using various diversity technologies.

Referring to FIG. 9, another example of the simulation results of the wireless communication system with TU6 channel model using various diversity technologies is shown. FIG. 9 is exemplified by two 6-path typical urban channel models (TU6). FIG. 9 shows a block error rate (BLER) 910 of a de-modulated wireless signal according to the conventional OFDM technology, a BLER 920 of a de-modulated wireless signal according to the group scrambling technology, a BLER 930 of a de-modulated wireless signal according to the grid group scrambling technology, and a BLER 940 of a de-modulated wireless signal according to the correlation scrambling technology. As indicated in FIG. 9, when the channel response has a larger delay spread, the correlated scrambling technology has robustness and will not degrade the wireless communication system.

According to the transmission method of a wireless signal and the transmitter using the same disclosed in the above embodiments of the invention, without changing the design of the receiver, on the part of a wireless communication system in a SFN, the correlated scrambler of each transmitter is utilized to encode the OFDM symbols carried by the corresponding subcarriers according to the highly correlated but not identical scrambling symbols, such that the channel response of the wireless signal received by the receiver possesses diversity and has smaller coherent bandwidth and shorter coherent time. Therefore, the receiver possesses a time frequency diversity gain in the coverage boundary between two or more transmitters. Moreover, as the scrambling symbols corresponding to two contiguous subcarriers are highly correlated, the accuracy in the channel estimation of the receiver is increased. With the channel coding and time interleaving functions of the system, the diversity gain of the receiver is increased, and the transmission function and coverage of the wireless communication system are improved as well.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A transmission method of a wireless signal, comprising:
   a. generating a plurality of orthogonal frequency division multiplexing (OFDM) symbols according to a data signal, wherein the OFDM symbols are carried by a plurality of subcarriers;
   b. generating a scrambling pattern comprising a plurality of scrambling symbols respectively corresponding to the subcarriers in the frequency domain, wherein the scrambling symbols corresponding to two contiguous subcarriers are correlated; and c. utilizing the scrambling symbols to encode the OFDM symbols carried by the corresponding subcarriers.

2. The transmission method of a wireless signal according to claim 1, wherein the scrambling symbols all have an equivalent unit gain.

3. The transmission method of a wireless signal according to claim 1, wherein the OFDM symbols comprise a plurality of data symbols and a plurality of pilot symbols, and the frequency difference between two contiguous pilot symbols in the frequency domain is smaller than a coherent bandwidth of the scrambling pattern.

4. The transmission method of a wireless signal according to claim 1, wherein the step b comprises:
  b1. generating a group of random numbers ranging from 0~2π;
  b2. enabling the random numbers to be uniformly distributed corresponding to the subcarriers; and
  b3. linearly interpolating and low-pass filtering the uniformly distributed random numbers to generate the scrambling pattern.

5. The transmission method of a wireless signal according to claim 1, wherein the step b comprises:
  b4. generating a group of time domain signals with a delay spread;
  b5. taking Fourier-transform on the group of time domain signals to obtain a group of frequency domain signals; and
  b6. scaling the group of frequency domain signals to generate the scrambling pattern.

6. The transmission method of a wireless signal according to claim 5, wherein in the step b5, the method further fine-tunes the group of time domain signals according to a Doppler frequency.

7. The transmission method of a wireless signal according to claim 6, wherein the OFDM symbols comprise a plurality of data symbols and a plurality of pilot symbols, the frequency difference between two contiguous pilot symbols in the frequency domain is smaller than the coherent bandwidth of the scrambling pattern in a frequency dimension, and the time difference between two contiguous pilot symbols in the time domain is smaller than a coherent time of the scrambling pattern in a time dimension.

8. The transmission method of a wireless signal according to claim 1, wherein the wireless signal is transmitted through a single frequency network (SFN).

9. The transmission method of a wireless signal according to claim 1, wherein the method channel-encodes the data signal to generate the OFDM symbols.

10. The transmission method of a wireless signal according to claim 1, wherein the method time-interleaves the data signal to generate the OFDM symbols.

11. The transmission method of a wireless signal according to claim 1, wherein the scrambling symbols of the scrambling pattern are not identical.

12. A transmitter of a wireless signal, comprising:
  an OFDM multiplexer for generating a plurality of OFDM symbols according to a data signal, wherein the OFDM symbols are carried by a plurality of subcarriers; and
  a correlated scrambler for generating a scrambling pattern; the scrambling pattern comprising a plurality of scrambling symbols respectively corresponding to the subcarriers;
  wherein the scrambling symbols corresponding to two contiguous subcarriers are correlated; and
  wherein a plurality of scrambling symbols of the scrambling pattern are utilized to encode the OFDM symbols carried by the corresponding subcarriers.

13. The transmitter of a wireless signal according to claim 12, wherein the scrambling symbols all have an equivalent unit gain.

14. The transmitter of a wireless signal according to claim 12, wherein the OFDM symbols comprises a plurality of data symbols and a plurality of pilot symbols, and the frequency difference between two contiguous pilot symbols in the frequency domain is smaller than a coherent bandwidth of the scrambling pattern.

15. The transmitter of a wireless signal according to claim 12, wherein the correlated scrambler comprises:
  a random number generator for generating a group of random numbers ranging from 0~2π;
  a zero-padding unit for enabling the random numbers to be uniformly distributed corresponding to the subcarriers;
  a linear interpolator for linearly interpolating the uniformly distributed random numbers;
  a low-pass filter for low-pass filtering the linearly interpolated random numbers to generate the scrambling pattern; and
  a multiplier for utilizing the scrambling symbols to encode the OFDM symbols carried by the corresponding subcarriers.

16. The transmitter of a wireless signal according to claim 12, wherein the correlated scrambler comprises:
  a path generator for generating a group of time domain signals with a delay spread;
  a Fourier transformer for taking Fourier-transform on the group of time domain signals to obtain a group of frequency domain signals;
  a scaler for scaling the group of frequency domain signals to generate the scrambling pattern; and
  a multiplier for utilizing the scrambling symbols to encode the OFDM symbols carried by the corresponding subcarriers.

17. The transmitter of a wireless signal according to claim 16, wherein the correlated scrambler further comprises:
  a Doppler frequency adjusting device coupled between the path generator and the Fourier transformer for fine-tuning the group of time domain signals according to a Doppler frequency.

18. The transmitter of a wireless signal according to claim 17, wherein the OFDM symbols comprise a plurality of data symbols and a plurality of pilot symbols, a frequency difference between two contiguous pilot symbols in the frequency domain is smaller than a coherent bandwidth of the scrambling pattern in a frequency dimension, and a time difference between two contiguous pilot symbols in the time domain is smaller than a coherent time of the scrambling pattern in a time dimension.

19. The transmitter of a wireless signal according to claim 12, wherein the wireless signal is transmitted through a single frequency network (SFN).

20. The transmitter of a wireless signal according to claim 12, further comprising:
  a channel encoder for channel-encoding the data signal.

21. The transmitter of a wireless signal according to claim 20, further comprising:
  a time interleaver coupled between the channel encoder and the OFDM multiplexer for time-interleaving the channel-encoded data signal.

22. The transmitter of a wireless signal according to claim 12, wherein the scrambling symbols of the scrambling pattern are not identical.

* * * * *